United States Patent
Bote Salla et al.

(10) Patent No.: US 8,424,187 B2
(45) Date of Patent: Apr. 23, 2013

(54) METHOD OF TERMINATING THE STATOR WINDING OF AN ELECTRIC MOTOR

(75) Inventors: Ramon Bote Salla, Sant Fost de Campcentelles (ES); Giampiero Tassinario, Florence (IT)

(73) Assignee: Infranor Holding SA, Yverdon-les-Bains (CH)

( * ) Notice: Subject to any disclaimer, the term of this patent is extended or adjusted under 35 U.S.C. 154(b) by 0 days.

(21) Appl. No.: 13/463,078

(22) Filed: May 3, 2012

(65) Prior Publication Data

US 2012/0233847 A1 Sep. 20, 2012

Related U.S. Application Data

(63) Continuation-in-part of application No. 11/409,444, filed on Apr. 21, 2006, now abandoned.

(30) Foreign Application Priority Data

Apr. 22, 2005 (EP) .................................. 05008827

(51) Int. Cl.
*H02K 3/50* (2006.01)
*H02K 15/00* (2006.01)
(52) U.S. Cl.
USPC ............... 29/596; 29/858; 29/874; 310/71; 336/192; 439/516; 439/709; 439/736; 439/885
(58) Field of Classification Search ............... 29/596, 29/874, 858; 336/192; 439/885, 516, 709, 439/736; 310/71
See application file for complete search history.

(56) References Cited

U.S. PATENT DOCUMENTS

| 3,496,504 | A | * | 2/1970 | Daley ........................ 336/96 |
| 3,518,616 | A | | 6/1970 | Lewis |
| 3,758,799 | A | | 9/1973 | Dochterman et al. |
| 3,874,073 | A | | 4/1975 | Dochterman et al. |
| 4,067,562 | A | | 1/1978 | Weber |
| 4,090,293 | A | | 5/1978 | van der Donk et al. |
| 4,130,331 | A | | 12/1978 | Neff et al. |
| 4,439,913 | A | | 4/1984 | Coquillart |
| 4,557,544 | A | | 12/1985 | Esser |
| 4,851,725 | A | | 7/1989 | Keck |

(Continued)

FOREIGN PATENT DOCUMENTS

| EP | 0 647 984 | 10/1994 |
| EP | 1 289 065 | 3/2003 |

(Continued)

OTHER PUBLICATIONS

English translation of office action issued by Japanese Patent Office for corresponding Japanese Application 2006-119791, mailing date Oct. 18, 2001.

(Continued)

*Primary Examiner* — Livius R Cazan
(74) *Attorney, Agent, or Firm* — Frommer Lawrence & Haug LLP; Ronald R. Santucci

(57) ABSTRACT

Provided is system and method for terminating stator windings to provide a fast, reliable, and convenient connection system. A U-shaped intermediary connection piece comprising individual pieces with cable exits is provided. Stator windings are attached to the individual pieces and the stator and connection piece are encapsulated with resin. The individual pieces are eliminated, thereby electrically isolating the cable exits.

4 Claims, 2 Drawing Sheets

U.S. PATENT DOCUMENTS

| | | | |
|---|---|---|---|
| 5,264,816 A | 11/1993 | Degenhart et al. | |
| 5,403,210 A | 4/1995 | Hasegawa | |
| 5,806,169 A | 9/1998 | Trago et al. | |
| 6,028,383 A | 2/2000 | Ohshita | |
| 6,600,244 B2 | 7/2003 | Okazaki et al. | |
| 6,800,973 B2 | 10/2004 | Futami et al. | |
| 6,828,704 B2 | 12/2004 | Okamoto et al. | |
| 6,841,904 B2 | 1/2005 | Sano et al. | |
| 6,844,636 B2 | 1/2005 | Lieu et al. | |
| 6,861,776 B2 | 3/2005 | Hashimoto | |
| 2003/0094879 A1 | 5/2003 | Kobayashi et al. | |
| 2003/0186594 A1 | 10/2003 | Davis et al. | |
| 2005/0118886 A1 | 6/2005 | Cha | |
| 2005/0208782 A1 | 9/2005 | Reed et al. | |
| 2006/0238042 A1 | 10/2006 | Bote Salla et al. | |

FOREIGN PATENT DOCUMENTS

| | | |
|---|---|---|
| ES | 8203168 | 9/1980 |
| JP | 52-041801 | 3/1977 |
| JP | 59-194645 | 11/1984 |
| JP | 5-300685 A | 11/1993 |
| JP | 6-031353 U | 4/1994 |
| JP | 6-284619 A | 10/1994 |
| JP | 7-122308 A | 5/1995 |
| JP | 9-215239 A | 8/1997 |
| JP | 2004-167895 | 6/2004 |

OTHER PUBLICATIONS

Manual Translation of JP 52-041801, "Method of Manufacturing a Terminal of a Stator of a Dynamo Electric Machine", Tadao Furusawa, Mar. 31, 1977.

Manual Translation of JP 59-194645, "AC Servo Motor", Yoichi Amaniya et al. Nov. 5, 1984.

Manual Translation of JP 2004-167895 "Apparatus for Insert Molding, Method for Manufacturing Insert Molded Article, and Method Manufacturing for Coil Bobbin for Motor", Takamitsu Maruyama, Jun. 17, 2004.

\* cited by examiner

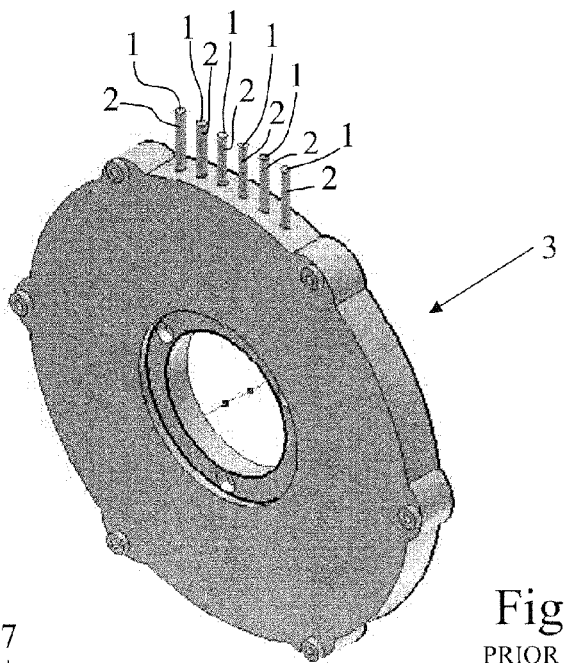
Fig.1
PRIOR ART
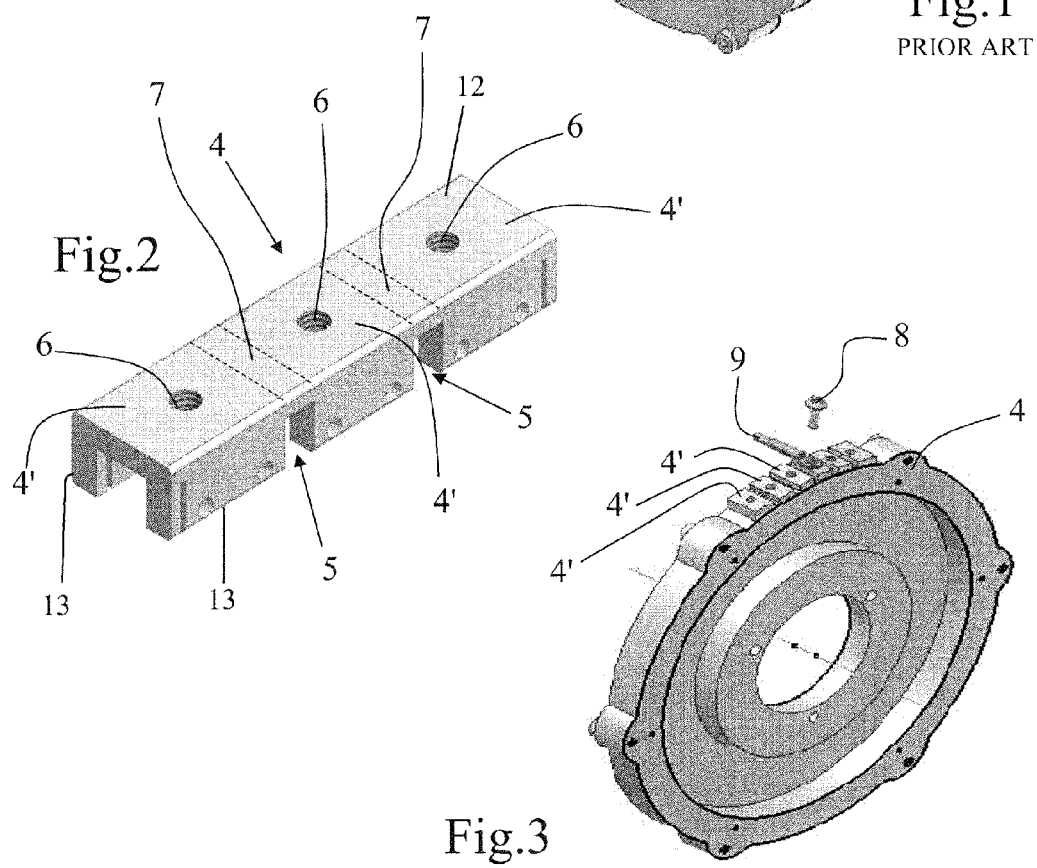
Fig.2
Fig.3

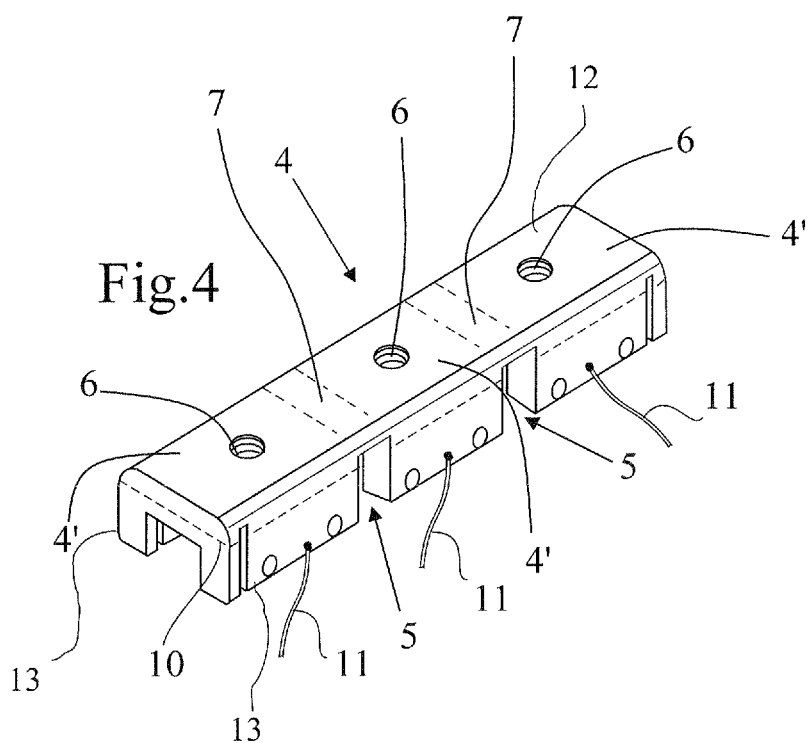

METHOD OF TERMINATING THE STATOR WINDING OF AN ELECTRIC MOTOR

BACKGROUND OF THE INVENTION

This application in a continuation-in-part of U.S. patent application Ser. No. 11/409,444 now abandoned, filed by the Applicants on Apr. 21, 2006 which claims priority to European Patent Application No. (EP) 05008827.7 filed Apr. 22, 2005, the disclosures of both are herein incorporated by reference.

FIELD OF THE INVENTION

This invention concerns a system for the electrical connection of encapsulated slotless stator windings in the laminated stator ring where the winding is inserted.

This is meant in particular for brushless motors with axial flow permanent magnets although it can be extended to radial flow motors.

The present invention introduces the idea of an encapsulated winding connection system for this type of stator with a cable opening designed for fast connection.

The present invention also introduces a method of terminating the stator windings to provide a fast, reliable, and convenient connection system.

INCORPORATION BY REFERENCE

All patents, patent applications, documents, references, manufacturer's instructions, descriptions, product specifications, and product sheets for any products mentioned herein are incorporated herein by reference, and may be employed in the practice of the invention.

DESCRIPTION OF THE PRIOR ART

As such, the process of encapsulation of windings of a stator is known in the art of electrical motors. For example, U.S. Pat. No. 4,067,562 discloses a method for encapsulating and impregnating windings of motor stators.

In addition, for a winding encapsulation that provides good thermal evacuation, it is essential that the thermal conductivity of the resin is high and also that porousness does not decrease the overall system conductivity. To achieve this it is necessary to vacuum-encapsulate the material in order to absorb the least air possible.

However, in order to leave the connection cable accessible from outside for easy handling (for example connection of cables), there must not be any excess epoxy resin in contact with the exit cables, as any excess will react with high levels of mechanical rigidity, making such connection difficult.

In the art, a solution is the one shown in FIG. 1, which represents the exit cables 1 with their insulation 2. The problem is that this insulation 2 is porous: when it is vacuum-encapsulated, the resin filters through said insulation and the cables become stiff. As a consequence, the insulation 2 may be damaged.

In addition, if the cables and their ends are also encapsulated, or at least partially encapsulated, they are difficult, if not impossible to disconnect from or to reconnect to the stator.

SUMMARY OF THE INVENTION

It is therefore an object of the present invention to improve the known systems.

It is another objective of the present invention to solve the mentioned connection problems in a simple, secure and inexpensive way.

It is further still an objection of the present invention to provide a method for terminating the windings of an encapsulated stator to provide a connection system that overcomes the connection problems discussed above.

In embodiments of the invention, a method is disclosed in which an inverted U-shaped intermediary connection piece is provided comprising n individual pieces connected by n−1 back parts, each individual piece comprising a cable exit adjacent at least one of the back parts. The individual pieces each have a top part and opposing legs extending from opposite edges of the top part. The individual pieces comprise n−1 cuts through the opposing legs, generally perpendicular to the legs, the cuts extending from the free ends of the legs towards the top part. A stator winding is attached to each of the individual pieces, and the connection piece and stator are encapsulated together with resin. Following encapsulation, the n−1 back parts are eliminated by n−1 machining operations. A machining operation as used herein means a straight-line path of a cutting tool while in contact with the connection piece. The path may be repeated at varying depths of cut to achieve the final depth of cut in the same machining operation. The elimination of the n−1 back parts electrically isolates each of the n individual pieces, and the associated cable exits, from adjacent individual pieces. Cables are then attached to the cable exits as appropriate.

In some embodiments, elimination of the n−1 back parts comprises n−1 machining operations resulting in n−1 cuts.

In some embodiments, the n−1 cuts through the opposing legs extend from the free ends of the legs toward the top part and may extend less than half way into the top part, or they may extend more than half way into the top part, without extending completely through the top part. Elimination of the n−1 back parts can be accomplished by cutting the top surface of the top part to a predetermined depth. The depth of cut is determined by the remaining thickness of the back parts following the n−1 cuts. The depth of cut is sufficient for the cut to intersect the n−1 cuts through the opposing legs. The cut is adequately deep and wide to electrically isolate the n individual pieces and the associated cable exits, however, the individual pieces remain intact with the top part and associated opposing legs electrically connected. The cut may be accomplished with one or more machining operations. Cables are then attached to the cable exits as appropriate.

BRIEF DESCRIPTION OF THE FIGURES

The invention will be best understood by description of embodiments illustrated in the accompanying drawings, which are included to provide a further understanding of the invention, and are incorporated into and constitute a part of this specification. The drawings presented herein illustrate exemplary embodiments of the invention and are provided for purposes of illustration and not limitation. Together with the description, the figures serve to explain the principles of the invention. In the drawings:

FIG. 1 shows a winding encapsulation according to the prior art;

FIG. 2 shows an example of the connection piece according to the invention;

FIG. 3 shows an encapsulated winding with the connection piece of the invention; and FIG. 4 shows an alternate embodiment of a connection piece in accordance with an aspect of the invention.

DETAILED DESCRIPTION OF THE PREFERRED EMBODIMENTS

Embodiments of the invention are described below with reference to the accompanying drawings which depict embodiments of the disclosed connection system and method, and exemplary applications thereof. However, it is to be understood that applications of the disclosed invention are not limited to those embodiments illustrated. Also, the invention is not limited to the depicted embodiments and details thereof, which are provided for purposes of illustration and not limitation.

In FIG. 1, as mentioned above, the winding is encapsulated (shown generally with reference 3) with the cables 1 attached. As indicated, the insulation 2 of the cables 1 is usually porous so that the resins used for encapsulation, with time, filter through the insulation 2 and the cables are then rigid. Moreover, a cable can not be exchanged since its connection is also encapsulated.

In order to solve this problem (if the cables come ready for connection, the connection time is optimized), this invention includes a method that uses an intermediary connection piece (referenced generally with 4) made of copper (Cu), or another suitable conducting material, as a connection piece.

This solution eliminates the problem of vacuum-encapsulation, as the non-porous state of the material used for the connection piece 4 does not allow the resin to filter through to the cable. This piece 4 is similar to that which is used as a collector in U.S. Pat. No. 4,439,913. The connection piece 4 comprises a piece of copper or other conducting material configured in an inverted U-shape with a top part 12 and opposing legs 13 extending from opposite longitudinal edges of the top surface. Connection piece 4 comprises individual pieces 4', each individual piece 4' comprising a cable exit 6, The connection piece may be slotted with 'n–1' cuts 5, 'n' being the number of cable exits 6.

According to some embodiments, the n–1 cuts 5 extend from the free ends of legs 13 up to, but not into, top part 12.

According to other embodiments, the n–1 cuts extend from the free end of the legs 13 into, but not cutting through, the thickness of the top part 12. In some embodiments, the cuts 5 extend through approximately half of the thickness of the top part 12. In other embodiments, the cuts may extend through more than half of the top part 12 thickness, but not through the thickness of the top part. As shown, in FIG. 2, there are two cuts 5 for three cable exits 6.

In practicing an embodiment of the invention, each of the windings of the stator are connected to one of the individual pieces 4' and electrically connected to cable exits 6. The connection to the individual pieces may be accomplished, for example by a screw, or by soldering, or by other means. The entire connection piece 4 is then encapsulated with resin, along with the stator, so that the resin also fills the cuts 5.

In one embodiment, a machining step is used to eliminate the back parts 7 of the piece 4 joining the individual pieces 4', and therefore also joining the cable exits 6, to each other, and the resin that fills the spaces hence not only serves to fasten the resulting individual connection pieces but also works as insulation. The machining step includes at least n–1 cutting tool paths, i.e. at least one path, and therefore one cut through the back part 7, for each cut 5. The tool paths are positioned such that at least a portion of the cutting tool passes over a portion of each slot 5, removing at least a portion of back part 7. The depth of the cutting tool paths are selected such that ultimately the cutting tool path cuts completely through the thickness of back part 7 and intersects cut 5. The removed portion of the back parts 7 is sufficient in width and depth to electrically isolate each cable exit 6 from the other cable exits 6.

Indeed, by the machining step of removing back part 7, each exit 6 will be on an individual piece 4', each individual piece 4' (and cable exit 6) will be electrically isolated from other individual pieces 4' and cable exits 6.

In an alternate embodiment illustrated in FIG. 4, the windings 11 of the stator are connected to each of the individual pieces 4' and electrically connected to cable exits 6. The connection piece 4 and the stator are encapsulated with resin such that the resin fills the cuts 5, as above. The cuts 5 extend from the free end of legs 13 toward the top part 12, and penetrate at least part way into the top part 12. A machining operation to a selected depth is performed on the top part 12, removing a portion of the thickness of the top part 12. The depth of the machining operation is indicated by 10 in FIG. 4. The depth of the machining operation is selected such that the machine cut intersects each of the n-1 cuts 5 without removing all of the top part 12. Thus, the machining operation removes a part of the top part 12, including all of each back part 7, electrically isolating each cable exit 6. However, individual pieces 4', comprising opposing legs 13 and top part 12, remain intact and electrically connected. The machining operation according to this embodiment may be accomplished with one or more cutting tool paths, and, therefore, a corresponding number of cuts.

Following encapsulation of the stator 3 and connection piece 4 with resin, and isolating the cable exits 6, cables 9 may be attached to the pieces 4'. Since the resulting pieces 4' are solid (for example made of metal), a screw 8 (see FIG. 3) can be used to connect the cable 9 through threads made in the exits 6 (see FIG. 2), thus allowing a fast, reliable, and convenient cable connection and disconnection.

In FIG. 3, one can easily see the individual pieces 4' which are each connected to a phase of the motor.

Of course, the connection piece is not limited the representation of FIG. 2 and may have more than three exits 6.

The possibility of encapsulating the stator winding independently from the laminated stator ring allows for a flexible mounting with at least the following remarkable advantages:

Possibility of recycling, ecologically better;
Possibility of manipulating the laminated stator ring without damaging the winding; and
Spare parts cheaper

We claim:

1. A method of terminating the stator windings of an electric motor, comprising the steps of:
   providing an intermediary connection piece generally configured in an inverted U-shape having a top part and opposing legs extending from opposite edges of said top part, the intermediary connection piece comprising:
   "n" individual pieces integrally formed with, and joined together by, "n–1" back parts, wherein n>1;
   a cable exit located on a top part of each of said "n" pieces and adjacent at least one of said "n–1" back parts; and
   "n–1" cuts through each of said opposing legs between said "n" pieces of the intermediary connection piece and adjacent said "n–1" back parts;
   connecting the windings of the stator to each of the cable exits of the intermediary connection piece;
   encapsulating the intermediary connection piece and the stator with resin;
   eliminating said "n–1" back parts thereby electrically isolating each cable exit; and connecting the cable exit of each individual piece to a cable.

2. The method of claim 1 wherein eliminating the "n−1" back parts comprises n−1 machining operations.

3. A method of terminating the stator windings of an electric motor, comprising the steps of;
- providing an intermediary connection piece generally configured in an inverted U-shape having a top part and opposing legs extending from opposite edges of said top part, the intermediary connection piece comprising:
- "n" individual pieces integrally formed with, and joined together by, "n−1" back parts, wherein n>1;
- a cable exit located on the top part of each of said "n" pieces and adjacent at least one of said "n−1" back parts; and
- "n−1" cuts through each of said opposing legs between and partially through said top part of the intermediary connection piece and adjacent said "n−1" back parts;
- connecting the windings of a stator to each of he said pieces of the intermediary connection piece;
- encapsulating the intermediary connection piece and the stator with resin;
- eliminating said "n−1" back parts by cutting the top surface of the intermediary connection piece thereby electrically isolating each cable exit; and
- connecting the cable exit of each individual piece to a cable.

4. The method of claim 3, wherein eliminating the "n−1" back parts comprises a single machining operation.

* * * * *